United States

Taira

[54] A WIDE ANGLE FLAT FIELD MICROSCOPIC OBJECTIVE OF LOW POWER

[72] Inventor: Akio Taira, Tokyo, Japan

[73] Assignee: Olympus Optical Co., Ltd., Tokyo, Japan

[22] Filed: July 23, 1970

[21] Appl. No.: 58,452

[30] Foreign Application Priority Data

Aug. 14, 1969 Japan..................................44/64374

[52] U.S. Cl. ......................350/225, 350/175 ML, 350/177
[51] Int. Cl. .........................................G02b 9/12, G02b 21/02
[58] Field of Search..................350/175 ML, 176, 177, 225, 350/227

[56] References Cited

UNITED STATES PATENTS

| | | | |
|---|---|---|---|
| 3,262,363 | 7/1966 | Zeigler | 350/175 ML UX |
| 2,822,728 | 2/1958 | Bernhardt | 350/175 ML UX |
| 3,399,017 | 8/1968 | Judd | 350/177 X |

Primary Examiner—John K. Corbin
Attorney—Kurt Kelman

[57] ABSTRACT

Microscopic objective lens consisting of a first, a second and a third lens group arranged in that order from the object side and separated respectively by airgaps from each other. The first lens group is constructed by a cemented meniscus lens component with the air contacting surfaces thereof concave toward the object side and the second lens group is constructed by a meniscus lens element with the surfaces thereof concave toward the object side while the third lens group is constructed by a cemented lens component consisting of a lens element of negative refractive power arranged at the object side and a lens element of positive refractive power arranged at the image side. The absolute value of the focal length of the second lens group is selected to be greater than the focal length of the entire system and the absolute value of the radius of curvature of the surface of the second lens group at the object side is selected to be smaller than half the focal length of the entire system while the absolute value of the radius of curvature of the air contacting surface of the first lens group at the object side is selected to be greater than 0.15 times the focal length of the entire system and the Abbe's number of the lens element of the third lens group at the image side thereof is selected to be greater than that of the lens element at the object side by at least 25.

1 Claims, 2 Drawing Figures

INVENTOR
AKIO TAIRA
BY Kurt Kelman
AGENT

WIDE ANGLE FLAT FIELD MICROSCOPIC OBJECTIVE OF LOW POWER

BACKGROUND OF THE INVENTION

The present invention relates to a microscopic objective lens and more particularly to a microscopic objective lens having a magnification of about 4 and a wide field of view the image height of which can be greater than 0.6 times the focal length of the objective lens, wherein the image surface is flat while a high-resolving power is obtained.

Heretofore, it has been difficult to provide a microscopic objective lens of a magnification of about 4 which is simple in construction and produced at a low cost and has yet a flat and wide field of view and a high-resolving power.

The present invention aims at avoiding the disadvantages of the prior art microscopic objective lens described above.

SUMMARY OF THE INVENTION

An object of the present invention is to provide a novel and useful microscopic objective lens of a magnification of about 4, which is simple in construction and produced at a low cost and yet has a high-resolving power as well as a wide, flat field of view.

DETAILED DESCRIPTION OF THE PREFERRED EMBODIMENT

Figure 1:
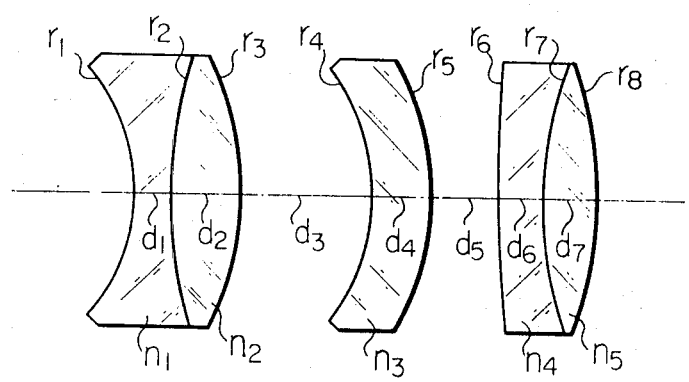
FIG. 1 is a longitudinal sectional view of an embodiment of the microscopic objective lens constructed in accordance with the present invention.

Referring to FIG. 1, the objective lens consists of a first, a second and a third lens group arranged in the order from the object side and separated respectively by airgaps from each other.

In accordance with the characteristic feature of the present invention, the first lens group is constructed by a cemented meniscus lens component with the air-contacting surfaces thereof concave toward the object side and the second lens group is constructed by a meniscus lens element with the surfaces thereof concave toward the object side while the third lens group is constructed by a cemented lens component consisting of a lens element of negative refractive power arranged at the object side and a lens element of positive refractive power arranged at the image side, and the focal length of the second lens group $fII$ is selected to satisfy the following relationship:

$$-fII > f$$

where:
$f$ = focal length of the entire system of the objective lens

If the absolute value $|fII|$ is made smaller than the focal length $f$, curvature of field and coma are remarkably increased so that they can not be compensated for by means of other lens elements of the objective lens.

Further, radius of curvature $r_4$ of the air-contacting surface of the second lens group at the object side thereof is selected to satisfy the following relationship:

$$|r_4| < f/2$$

If the absolute value $|r_4|$ is made greater than the above value $f/2$, the compensation for the curvature of field is made insufficient. To compensate for the above undercorrection of the curvature of field, the radius of curvature $r_1$ of the foremost surface of the first lens group must be made small. However, when radius of curvature $r_1$ is made small, coma will be remarkably increased thereby deteriorating the quality of the objective lens.

Therefore, the absolute value of radius of curvature $|r_1|$ must be kept to satisfy the following relationship:

$$|r_1| > 0.15f$$

If the absolute value of $|r_1|$ is made smaller than the above value of $0.15f$, the coma resulting from the radius of curvature $|r_1|$ can not be compensated for by other lens elements of the objective lens.

Finally, the Abbe's numbers $\nu_4$, $\nu_5$ respectively of the front and the rear lens element of the third lens group must be selected to satisfy the following relationship:

$$\nu_5 - \nu_4 > 25$$

If the difference $\nu_5 - \nu_4$ is made smaller than the above limit 25, chromatic spherical aberration is remarkably increased so that it can not be compensated for by other lens elements of the objective lens.

An example of the microscopic objective lens is shown in the following table:

|  |  |  |  |  |  |
|---|---|---|---|---|---|
|  | Focal length |  | $f = 28.4$ |  |  |
|  | Magnification |  | $M = -4.0$ |  |  |
|  | Numerical aperture |  | $N.A. = 0.1$ |  |  |
| $r_1$ −6.13 | $d_1$ 1.2 |  | 1 |  |  |
| $r_2$ 14.7 | $d_2$ 2.5 | $n_1$ 1.516 |  | $\nu_1$ 64.0 |  |
| $r_3$ −9.27 | $d_3$ 4.7 | $n_2$ 1.744 |  | $\nu_2$ 44.7 |  |
| $r_4$ −6.51 | $d_4$ 2 |  | 1 |  |  |
| $r_5$ −10 | $d_5$ 2.6 | $n_3$ 1.603 |  | $\nu_3$ 38.0 |  |
| $r_6$ 54.07 | $d_6$ 1.3 |  | 1 |  |  |
| $r_7$ 13.97 | $d_7$ 2.1 | $n_4$ 1.699 |  | $\nu_4$ 30.1 |  |
| $r_8$ −13.57 |  | $n_5$ 1.487 |  | $\nu_5$ 84.5 |  |
|  |  |  | 1 |  |  | where:
$r_i$ = radius of curvature of the respective surface each of the lens elements ($i=1, 2, --- 8$, arranged in the order beginning at the object side)

$d_i$ = thickness of lens element or airgap ($i=1, 2 --- 7$, arranged in the order beginning at the object side)

$n_i$ = refractive index of lens element ($i=1, 2, --- 5$, arranged in the order beginning at the object side)

1 = refractive index of air $\nu_i$ = Abbe's number of lens element ($i=1, 2, --- 5$, arranged in the order beginning at the object side)

Figure 2:
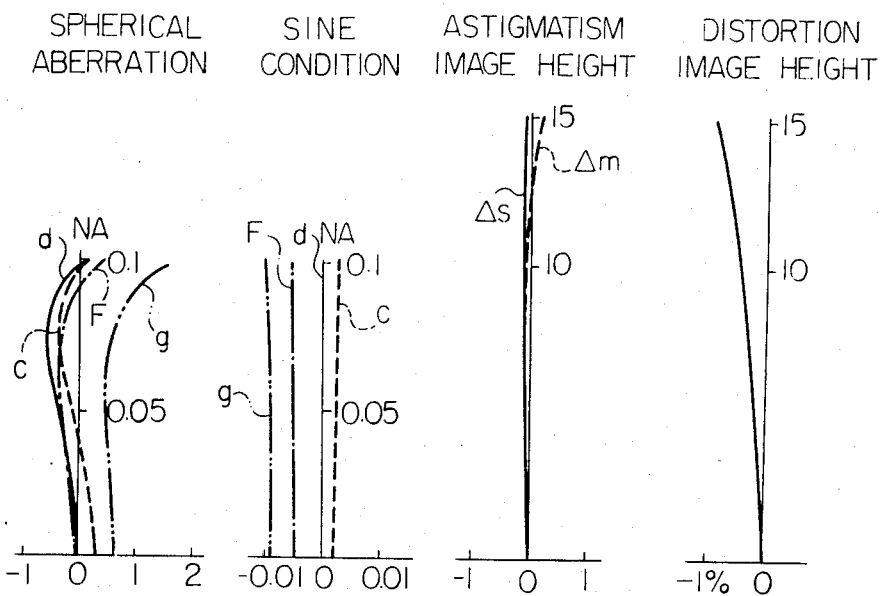
FIG. 2 shows various aberration curves of the objective lens of FIG. 1.

As shown in FIG. 2 showing the aberrations of the above example, various aberrations are remarkably compensated for in the objective lens of the present invention.

I claim:

1. Microscopic objective lens consisting of a first, a second and a third lens group arranged in the order from the object side and separated respectively by airgaps from each other, wherein the improvement comprises said first lens group constructed by a cemented meniscus lens component with the air-contacting surfaces thereof being concave toward the object side, said second lens group constructed by a meniscus lens element with the surfaces thereof being concave toward the object side and said third lens group constructed by a cemented lens component consisting of a lens element of negative refractive power arranged at the object side and a lens element of positive refractive power arranged at the image side, said lens groups satisfying the following relationship:

$$-fII > f$$
$$|r_4| \leq f/2$$
$$|r_1| \geq 0.15f$$
$$\nu_5 - \nu_4 \geq 25$$

where:
$f$ = focal length of the entire system
$fII$ = focal length of the second lens group
$r_i$ = radius of curvature of the respective surface each of the lens elements ($i=1, 2 --- 8$, arranged in the order beginning at the object side)
$\nu_i$ = Abbe's number of the material each of the lens elements ($i=1, 2 --- 5$, arranged in the order beginning at the object side), and the lens satisfying the following table:

Focal length $f = 28.4$
Magnification $M = -4.0$
Numerical aperture $N.A. = 0.1$

| | | | | | |
|---|---|---|---|---|---|
| $r_1$ −6.13 | $d_1$ 1.2 | | 1 | | |
| $r_2$ 14.7 | $d_2$ 2.5 | | $n_1$ 1.516 | $\nu_1$ 64.0 | |
| $r_3$ −9.27 | $d_3$ 4.7 | | $n_2$ 1.744 | $\nu_2$ 44.7 | |
| $r_4$ −6.51 | $d_4$ 2 | | 1 | | |
| $r_5$ −10 | $d_5$ 2.6 | | $n_3$ 1.603 | $\nu_3$ 38.0 | |
| $r_6$ 54.07 | $d_6$ 1.3 | | 1 | | |
| $r_7$ 13.97 | $d_7$ 2.1 | | $n_4$ 1.699 | $\nu_4$ 30.1 | |
| $r_8$ −13.57 | | | $n_5$ 1.487 | $\nu_5$ 84.5 | |
| | | | 1 | | | where:

$r_i$ = radius of curvature of the respective surface each of the lens elements ($i = 1, 2, \cdots 8$, arranged in the order beginning at the object side)

$d_i$ = thickness of lens element or airgap ($i = 1, 2 \cdots 7$, arranged in the order beginning at the object side)

$n_i$ = refractive index of lens element ($i = 1, 2 \cdots 5$, arranged in the order beginning at the object side)

1 = refractive index of air.

$\nu_i$ = Abbe's number of lens element ($i = 1, 2, \cdots 5$, arranged in the order beginning at the object side).

As shown in Fig. 2 showing the aberrations of the above example, various aberrations are remarkably compensated for in the objective lens of the present invention.

* * * * *